United States Patent

[11] 3,602,614

[72] Inventors Edgar Zelle;
Gerke Rastede, both of Heino, Oldenburg, Germany
[21] Appl. No. 14,331
[22] Filed Feb. 26, 1970
[45] Patented Aug. 31, 1971
[73] Assignee Licentia Patent-Verwaltungs-G.m.b.H.
Frankfurt, Germany
[32] Priority Feb. 26, 1969
[33] Germany
[31] P 19 09 610.7

[54] POSITIVE DISPLACEMENT PUMP
17 Claims, 7 Drawing Figs.
[52] U.S. Cl. .................................................... 417/461, 74/56
[51] Int. Cl. ........................................................ F04b 19/02, F16h 25/12
[50] Field of Search ........................................... 417/460, 410, 461, 462, 415, 490; 74/56; 92/31

[56] References Cited
UNITED STATES PATENTS
2,513,979  7/1950  Whitney ........................ 417/461 X
2,819,678  1/1958  Nordell et al. ................. 74/56 X Primary Examiner—Robert M. Walker
Attorney—Spencer & Kaye ABSTRACT: A positive displacement pump having a rotor member and a stator member mounted for rotation with respect to each other and first and second bearing bushings spaced axially from one another and mounted for rotation with one of the members. Each of the bearing bushings defines a cam surface which faces the cam surface of the other bearing bushing, the cam surfaces being parallel to one another and oriented at an angle α to a plane perpendicular to the axis of rotation of the members relative to one another. An annular piston arranged between the cam surfaces of the bearing bushings is keyed to one of the members and has opposing faces forming an angle between themselves so that each face can bear against a respective cam surface of the bearing bushings so as to permit the piston to be oscillated between the cam surfaces of the bearing bushings.

Inventors.
Edgar Zelle
Heino Gerke

BY *Spencer & Kaye*
ATTORNEYS.

Inventors.
Edgar Zelle
Heino Gerke

POSITIVE DISPLACEMENT PUMP

BACKGROUND OF THE INVENTION

The present invention relates to a positive displacement pump for compressing a gas or conveying a liquid in which a cam converts the rotary movement of the rotating component of an electric driving motor into the oscillating movement of a driven piston at each of whose two ends there is disposed a compression or conveying chamber.

It is known for such pumps, e.g. according to German Pat. No. 943,985 to Goeldner, to provide one end of the drive shaft with a sloped surface so as to form a cam against which the sloped surface of a piston is pressed. This piston is displaceable in the axial direction, but not rotatable, so as to convert the rotary movement of the shaft to an axial movement of the piston. There is thus produced a single acting pump which can be modified into a double-acting pump by providing a cavity in the interior of the piston, which cavity is variable through rotation of the cam and is utilized as a compression or conveying chamber. In this arrangement there are two conveying chambers of different sizes which can both be utilized to convey the same medium, but it is relatively difficult and complicated to safely and pressure-tightly connect the conveying chamber disposed in the interior of the movable piston with the necessary conveying lines. It has been proposed to use the conveying chamber in the interior of the piston merely as a lubricating pump, but this appears to be rather costly.

According to U.S. Pat. No. 2,508,253 to Haggardt, issued May 16th, 1950, it is further known to dispose a double-acting piston engine within the center bore of the rotor of an electric motor. Here, the pump piston is moved axially to-and-fro by a ball or a pin which rotates with the rotor and slides in a cam of the piston constructed in the form of a slot. This arrangement has the drawback that the forces transmittable by the motor to the piston are small because of the small dimensions of the ball or pin, which were so designed for structural reasons and a great amount of wear must be expected at these components and at the cam. Finally, the construction of this arrangement is relatively complicated and therefore seems unsuited for mass production.

SUMMARY OF THE INVENTION

It is an object of the present invention to provide a double-acting, positive displacement pump which is driven by an electric motor and which is not subject to great wear, which operates without complicated control arrangements and consists of easily producible components, and in which the lubricating problem is also solved with simple means. The pump meets the requirements of being easily producible in large numbers, particularly as a compression refrigeration machine, and having the smallest possible dimensions with the highest possible conveying output.

According to the present invention, the pump includes a piston disposed on the stationary shaft of the drive motor within the bearing liner in the bearing plate of the electric motor between two bushings firmly connected with the bearing plate. This piston is mounted to be movable only in the axial direction of the drive motor shaft, and both ends of the piston are sloped at a given, identical angle $\alpha$ to a plane perpendicular to the axial direction, but sloping in opposite directions. They thus form cams bordering directly on other cams formed at the ends of the bushings facing the rotary piston by parallel slopes of the same angle $\alpha$, so that upon rotation of the bushings the adjacent cams slide on one another and the piston undergoes an oscillating movement. This results in a compression or conveying chamber being formed between each of the two ends of the piston and the adjacent bushings and having a variable volume which depends on the momentary position of the rotary piston and the bushings with respect to one another.

BRIEF DESCRIPTION OF THE DRAWINGS

FIG. 1b is a cross-sectional view of the pump shaft taken generally along line 1b—1b of FIG. 1a.

FIG. 1c is a cross-sectional view of the pump shaft taken generally along line 1c—1c of FIG. 1a.

FIG. 1d is a cross-sectional view of the pump shaft taken generally along line 1d—1d of FIG. 1a.

DESCRIPTION OF THE PREFERRED EMBODIMENTS

Figure 1A:
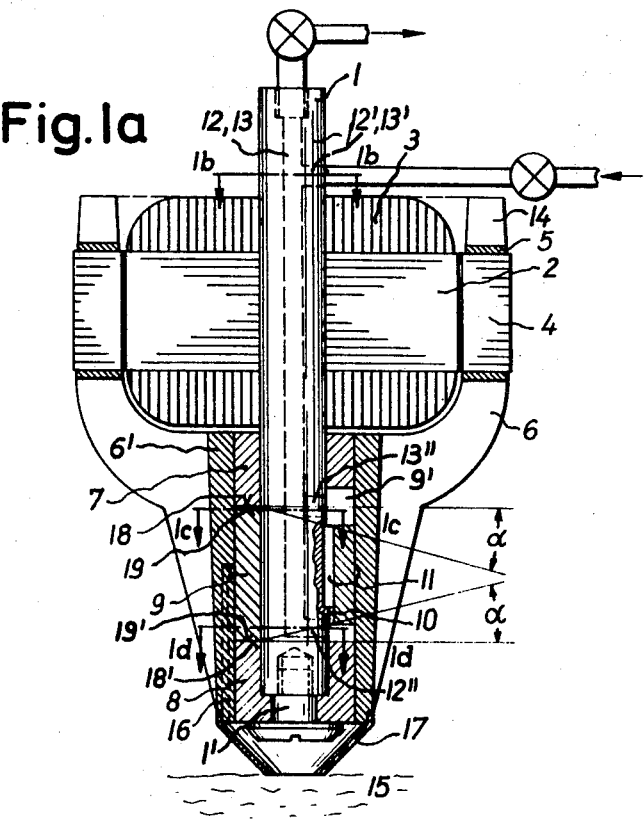
FIG. 1a is a side elevation view, partly in cross section, of a pump according to the present invention having a vertically disposed shaft and with an external rotor motor.
Figure 1B:
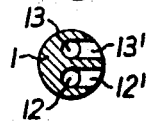
Figure 1C:
Figure 1D:

FIG. 1 shows an embodiment of the invention in which the positive displacement pump is disposed directly on the shaft of an external rotor electric motor. On the stationary perpendicularly disposed shaft 1 there is fastened the stator lamination core 2 which receives the stator windings 3. The rotor 4 rotates around the stator. The short-circuit winding 5 of the rotor is made in the conventional manner of aluminum and is manufactured by an injection molding process. In the same operation, the bearing support 6 and the ventilation vanes 14 are produced, forming a structural unit with the short-circuit winding 5. The rotor 4 is journaled to the shaft 1 by means of the two tubular bushings 7 and 8, which are disposed within the bearing liner 6' and are permanently connected with the bearing support 6. The rotor assembly is held in place by a bolt 1'. The tubular piston 9 is disposed between the two bearing bushings 7 and 8 on shaft 1. The ends of piston 9 as well as the ends of bushings 7 and 8 facing the piston ends are sloped at a given angle $\alpha$ with respect to a plane perpendicular to the center axis of the shaft 1, so that their development produces a sine curve or a similar curve. The facing edges 18 and 19 of bushing 7 and of piston 9 are perpendicular to the axial direction of shaft 1—as are the facing edges 18' and 19' of bushing 8 and piston 9. These edges form the cams for the positive displacement pump, and slide on one another so that when the bearing support 6 is rotated there results a movement of the piston 9 in the axial direction of shaft 1. The two bushings 7 and 8 are so mounted in the bearing liner that their slopes are exactly parallel with one another, i.e. the space between them is constant around the periphery of shaft 1. The ends of piston 9, however, are so constructed that their slopes are in opposite directions, and the length of the piston 9 exhibits a maximum and a minimum when seen in a developed view.

The piston 9 has on its inner circumference a groove 10 which is disposed at any arbitrary point around its circumference and in which slides an adjusting spring element 11 fastened to shaft 1. Shaft 1 is, thus, prevented from rotating, but not from moving axially. Element 11 can, of course, be replaced by any other construction suitable to permit movement of the piston 9 only in the axial direction of shaft 1. Due to the slopes of the bushings and of the piston going in different directions there is produced at the two ends of the rotary piston a compression or conveying chamber, such as 9' of FIG. 1, whose volume varies between a predetermined maximum and a predetermined minimum when the bearing plate 6 is rotated, depending on the position of the piston and of the bushings with respect to one another. One of the two compression or conveying chambers reaches a maximum whenever the other is at a minimum. In the normal case, the two chambers are of the same size. However, for special applications they may be constructed to have different volumes by changing their diameters. The size of the chambers is thus dependent, in the normal case, on the magnitude of angle α by which—when the development of the cams is considered—the amplitude level of these cams is determined. It further depends on the diameter of shaft 1 or bearing liner 6, and on the wall thickness of the bushings 7 and 8, as well as on the dimensions of piston 9. The connection of bushings 7 and 8 with the bearing plate 6 is preferably produced by means of an adhesive, but can also be effected by shrink fitting, by setscrews or screw nails, by supercooling, or similar known measures.

In order to make these chambers usable, the shaft 1 is provided with two bores 12 and 13 extending in the axial direction of shaft 1, of which each one is in communication through a preferably slot-shaped opening with one of the compression or conveying chambers. Each one of the two bores 12 and 13, for example, is provided with a fork at the end of shaft 1; the one branch containing a suction valve and the other a pressure valve. The slot-shaped openings are preferably disposed about the midpoint between the two extreme end portions of the chambers.

Suitable for this purpose are leaf spring valves or ball valves, which can be used as suction valve or pressure valve.

In order to assure lubrication of the arrangement, a funnel-shaped, tubular piece 17 is fastened in a known manner to bearing support 6 and extends into an appropriate oil sump 15. In conjunction with, for example, bore 16 in liner 6', the oil lifted from the oil sump 15 due to the centrifugal force generated by the rotation of rotor 6 is passed through tubular piece 17 to the lubricating points of the bearing bushings 7, 8 and the piston 9.

Figure 2:
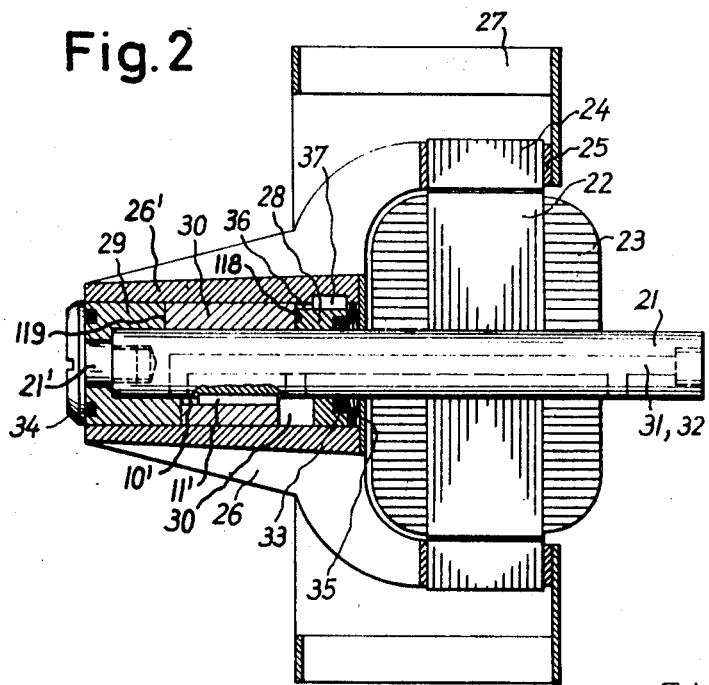
FIG. 2 is a side elevation view, partly in cross section, of a pump according to the present invention having a horizontally disposed shaft, and with an external rotor motor.

The arrangement shown in FIG. 1 is suited as a compressor, particularly for refrigerators and freezers, but also as a vacuum pump or as a conveying pump for heating oil or similar liquids. An embodiment particularly suited for this is illustrated in FIG. 2, which shows a portion of an oil heating assembly. The pump in this embodiment is placed directly on the stationary shaft 21 of an electric motor having an external rotor; the shaft, however, being horizontally disposed. The stator laminations 22 are fastened to shaft 21, and the stator windings 23 are disposed in the grooves of laminations 22. The stator laminations 22 are enclosed by a rotor 24 whose short-circuit winding 25 forms a structural unit with bearing support 26 and to which are also attached the ventilating vanes 27 for the blower of the oil heating assembly. The construction of the oil pump of FIG. 2 is otherwise identical to that of the compressor shown in FIG. 1. Here, too, the annular piston 30 moves between two bearing bushings 28 and 29. A bolt 21' holds the assembly in place. The movement of piston 30 forms chambers such as 30'. Piston 30 is restrained from rotating by element 11' in a groove 10'. The conveying lines for the, e.g., heating oil to be conveyed are formed by bores 31 and 32, in shaft 21, these bores and valve connections being the same as those of FIG. 1. The heating oil to be conveyed serves as the lubricant for the pump and is prevented from leaving the pump by seals 33 and 34. These seals are of a conventional nature. In order to produce as effective a tolerance compensation as possible for the cams 118, 119 the bearing bushing 28 of this embodiment is so fastened in the bearing liner 26' of bearing plate 26 that it is movable in the axial direction, but is held in its position by a cup spring 35 and is pressed against piston 30. Bearing bushing 28 is provided with a groove 36 in which a setting spring element 37 slides. Setting spring 37 is fastened in the bearing liner 26'. This spring element 37 serves as a follower. This movable arrangement of the bearing bushing 28 can be used in the same sense in all the other embodiments of the present invention. The spring force of the cup spring 35 can be set to the desired compression force so that there can also be produced an effect similar to a pressure equalization chamber.

Figure 3:
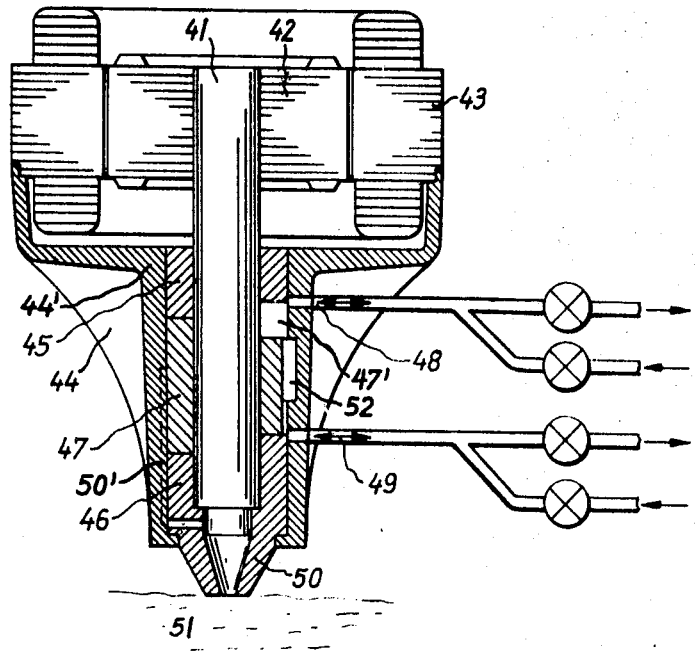
FIG. 3 is a side elevation view, partly in cross section, of a pump according to the present invention disposed with an internal rotor motor.

FIG. 3 shows a pump according to the present invention driven by an electric motor having an internal rotor. On the rotor shaft 41 there is fastened the rotor laminations 42 which rotate in the bore formed by the stator laminations 43. The bearing support 44 is fastened to the stator laminations 43. Bearing bushings 45 and 46 which are permanently connected with the rotor shaft 41 are journaled in the bearing liner 44' of the bearing support 44. Between the two bearing bushings 45, 46 there is disposed the piston 47 which is held in the bearing liner 44' by element 52 in a manner like that of the embodiment of FIGS. 1 and 2, so that it can move only in the axial direction of the rotor shaft 41. The compression or conveying chambers, such as 47', disposed at both ends of piston 47 are each provided with an inlet and outlet opening 48 and 49, which are brought as bores through bearing plate 44. Lubrication is accomplished through a bore 50' by a preferably vertical arrangement of the rotor shaft 41 through the funnel-type protrusion 50 attached to the bearing bushing 46, and which extends into an oil sump 51.

Figure 4:
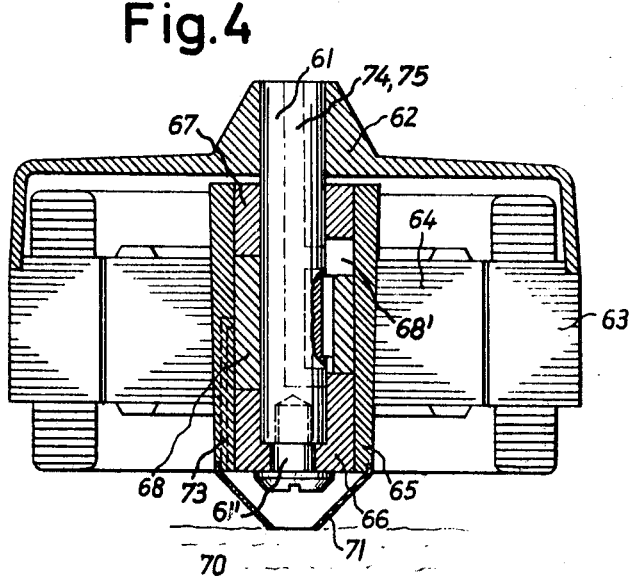
FIG. 4 is a side elevation view, partly in cross section, of a pump according to the present invention disposed in the interior of an internal rotor motor.

FIG. 4 illustrates an embodiment which has a substantially shorter structural length than the previously described embodiments. This arrangement is preferably used as a compression refrigeration machine. The shaft 61 is constructed to be a vertical, stationary shaft and is firmly seated in bearing plate 62 which is fastened to stator laminations 63. Rotor 64, which is fastened to a hollow cylinder 65, rotates in the bore formed by stator laminations 63 and is journaled to shaft 61 by means of the two bearing bushings 66 and 67 fastened in hollow cylinder 65. A bolt 61' holds the assembly together. The piston 68 is disposed between the two bearing bushings 66 and 67 and is kept from rotary movement by an element 72 similar to those used in the embodiments of FIGS. 1–3. Bearing bushings 66 and 67 and piston 68 are so designed, as it has already been described in relation to FIG. 1, that compression or conveying chambers, such as 68' are formed at both ends of the rotary piston 68, through which the medium to be conveyed is sucked in and expelled via bores 74, 75 in shaft 61. These bores 74, 75 are connected to suitable valves (not shown) in the manner of bores 12, 13 of FIG. 1. Lubrication of the arrangement is assured by the funnel 71 attached to hollow cylinder 65 and extending into an oil sump 70. The oil is fed to a bore 73, which is similar to those of FIG. 1.

The present invention has the advantage that the rotary movement of the driving engine can be very easily converted into the oscillating movement of the pump piston. The piston employed has only a relatively small mass so that the energy losses for overcoming the inertia of the piston are relatively low. The arrangement can easily be controlled, and, due to the relatively long length of the piston and the bearing bushings, no special seals are required, since these long supporting surfaces are fluidtight against the overpressure encountered. It is, of course, possible within the scope of the present invention to dispose a plurality of such pumps in cascade arrangement on a common shaft, and with a common drive. The design of the pump with bearing bushings fastened by means of, e.g., screw nails permits the airgap between the bearing bushings and the piston to be adjusted when required because of wear.

It will be understood that the above description of the present invention is susceptible to various modifications, changes and adaptations, and the same are intended to be comprehended within the meaning and range of equivalents of the appended claims.

1. Apparatus for pumping a fluid, comprising, in combination:
   a. means including a first member and a second member mounted for rotation with respect to each other;
   b. first and second bearing means spaced axially from one another and mounted for rotation with said first member, said bearing means each defining a cam surface which faces the cam surface of the other bearing means, the cam surfaces being parallel to one another and oriented at an angle α to a plane perpendicular to the axis of rotation of said members; and
   c. piston means arranged between the cam surfaces of said bearing means, and mounted for rotation with said second member and movement between said bearing means and having opposing faces forming an angle with respect to one another, with each face bearing against a respective cam surface of said bearing means;

d. said piston means and said bearing means defining chambers between the faces and cam surfaces, respectively whose volumes vary in dependence on the momentary position of said piston means with respect to the cam surfaces of said bearing means.

2. An apparatus as defined in claim 1, wherein said second member includes a shaft which defines at least two parallel, axial bores, each of which bores is connected to a respective one of the chambers formed by said piston means and the camming surfaces of said bearing means, and each bore having an outlet connected to a suction valve and an outlet connected to a pressure valve.

3. An apparatus as defined in claim 2 wherein said second member includes a stator lamination bundle mounted on said shaft, and wherein said first member has a rotor winding and a portion defining a support for said bearing means.

4. An apparatus as defined in claim 3, further including a funnel-shaped element defining a larger and a smaller opening and which is mounted by its larger opening to said support for said bearing means so as to rotate with said first member, such that when the smaller opening of said funnel-shaped element is extended partially into an oil sump, the oil is lifted during rotation of the funnel-shaped element, and wherein said support for said bearing means defines a bore through which the oil is distributed to said piston means and said bearing means.

5. An apparatus as defined in claim 4, further including an adjusting spring element, and wherein said shaft and said piston means each define a groove in which said spring element is mounted so as to prevent said piston means from rotating with respect to said shaft.

6. An apparatus as defined in claim 5, wherein said first member has a plurality of ventilating vanes disposed about the rotor portion to form a blower.

7. An apparatus as defined in claim 6, wherein the path of movement of the cam surfaces of said bearing means and the opposing face of said piston means defines a sine curve or a similar curve, and wherein the cam surfaces of said bearing means are in a plane which is perpendicular to the movement of said piston means.

8. An apparatus as defined in claim 7, wherein said first bearing means is mounted with respect to said first member for movement parallel to the axis of rotation of said members, and further including means biasing said first bearing means toward said piston means.

9. An apparatus as defined in claim 1, wherein said second member encloses the periphery of said bearing means and said piston means and defines the same number of pairs of bores as there are chambers formed by said piston means and the cam surfaces of said bearing means, each pair of bores being in communication with a respective one of the chambers, and one of each pair of the bores being connected to a suction valve and the other of the bores being connected to a pressure valve.

10. An apparatus as defined in claim 9, wherein said first member has a shaft and an electric motor rotor mounted on said shaft, and wherein said bearing means are mounted on said shaft for rotation with said shaft.

11. An apparatus as defined in claim 10, wherein said shaft is vertically oriented, and wherein said second bearing means has a funnel-shaped portion defining a larger and a smaller openings, with its smaller opening extending away from the lower portion of said vertically oriented shaft, so that the smaller opening of said funnel-shaped portion of said second bearing means may be extended into an oil sump.

12. An apparatus as defined in claim 11, further including an adjusting spring element, and wherein said piston means and said portion of said second member enclosing the periphery of said piston means and said bearing means define grooves in which said spring element is mounted so as to prevent said piston means from rotating with respect to said second member.

13. An apparatus as defined in claim 12, wherein the path of movement of the cam surfaces of said bearing means and the opposing faces of said piston means defines a sine curve or a similar curve, and wherein the cam surfaces of said bearing means are in a plane which is perpendicular to the path of travel of said piston means.

14. An apparatus as defined in claim 13, wherein said first bearing means is mounted with respect to said first member for movement parallel to the axis of rotation of said members, and further including means biasing said first bearing means toward said piston means.

15. An apparatus as defined in claim 1, wherein said second member has a shaft and wherein said first member has a tubular element having an internal diameter great enough for said tubular element to fit over said shaft, with said bearing means and said piston means arranged between said tubular element and said shaft, and further including an electric motor rotor which is mounted around said tubular element.

16. An apparatus as defined in claim 15, wherein the path of movement of the cam surfaces of said bearing means and the opposing faces of said piston means defines a sine curve or a similar curve, and wherein the cam surfaces of said bearing means are in a plane perpendicular to the path of movement of said piston means.

17. An apparatus as defined in claim 1, wherein said first bearing means is mounted with respect to said first member for movement in the direction of the axis of rotation of said members, and further including means biasing said first bearing means toward said piston means.